United States Patent
Nishiyama et al.

[11] Patent Number: 5,986,046
[45] Date of Patent: Nov. 16, 1999

[54] OXZIDANT SOLUTION FOR SYNTHESIZING HEAT-RESISTANT ELECTROCONDUCTIVE POLYMER AND METHOD FOR PREPARING ELECTROCONDUCTIVE POLYMER

[75] Inventors: Toshihiko Nishiyama, Tokyo; Takashi Fukaumi, Toyama; Atushi Kobayashi, Tokyo; Masashi Ohi, Tokyo; Yoshihiko Saiki, Tokyo; Kazuaki Fukushima, Tokyo; Tomitaro Hara, Tokyo; Shinji Takeoka, Tokyo; Kimihisa Yamamoto, Tokyo; Eishun Tuchida, Tokyo, all of Japan

[73] Assignee: NEC Corporation, Tokyo, Japan

[21] Appl. No.: 09/036,996

[22] Filed: Mar. 9, 1998

[30] Foreign Application Priority Data

Mar. 7, 1997 [JP] Japan .................. 9-053075

[51] Int. Cl.$^6$ .................. C08G 73/06; C08K 5/01; H01B 1/00
[52] U.S. Cl. .................. 528/423; 252/500; 252/519; 524/745; 524/755; 524/785
[58] Field of Search .................. 528/423; 252/500, 252/519; 524/745, 755, 785

[56] References Cited

U.S. PATENT DOCUMENTS 4,697,001  9/1987  Walker et al. .................. 528/423

FOREIGN PATENT DOCUMENTS

| 0267392 | 5/1988 | European Pat. Off. . |
| 0380726 | 8/1990 | European Pat. Off. . |
| 0720188 | 12/1995 | European Pat. Off. . |
| 564970 | 9/1993 | Japan . |
| 9025417 | 1/1997 | Japan . |

*Primary Examiner*—Samuel A. Acquah
*Attorney, Agent, or Firm*—Hayes, Soloway, Hennessey, Grossman & Hage PC

[57] ABSTRACT

An oxidant solution for synthesizing a heat-resistant electroconductive polymer, composed of a solution of a non-protonic organic solvent and an oxidant of the organic compound iron salt expressed by the following formula:

$$Fe^{3++sc\ O}[(X)L-(M)m-(Y^-)n]pH^+q$$

where X is COOH or OH
M is organic compound
Y is strong electrolytic anion
"L", "m" and "n" are not less than 1
3o+q=np, but in the case of o=1, 3<p

10 Claims, 5 Drawing Sheets

| | IRON CONTENT (wt%) | INITIAL CONDUCTIVITY (S/cm) | CONDUCTIVITY (S/cm) AND CONDUCTIVITY CHANGE(%) AFTER ELAPSE OF 20 HOURS | CONDUCTIVITY (S/cm) AND CONDUCTIVITY CHANGE(%) AFTER ELAPSE OF 100 HOURS |
|---|---|---|---|---|
| EMBODIMENT 1 | 0.07 | 37 | 34 (S/cm), 92(%) | 30 (S/cm), 80(%) |
| EMBODIMENT 2 | 0.04 | 14 | 14 (S/cm), 99(%) | 13 (S/cm), 95(%) |
| EMBODIMENT 3 | 0.07 | 21 | 19 (S/cm), 88(%) | 16 (S/cm), 75(%) |
| COMPARATIVE 1 | 0.04 | 30 | 5 (S/cm), 15(%) | — |
| COMPARATIVE 2 | 4.0 | 9.7 | 0 (S/cm), 5.5(%) | — |
| COMPARATIVE 3 | 0.10 | 17 | 1.7 (S/cm), 10(%) | — |

$$\text{CONDUCTIVITY CHANGE} = \frac{\text{CONDUCTIVITY AFTER 20 OR 100 HOURS}}{\text{INITIAL CONDUCTIVITY}} \times 100(\%)$$

OXZIDANT SOLUTION FOR SYNTHESIZING HEAT-RESISTANT ELECTROCONDUCTIVE POLYMER AND METHOD FOR PREPARING ELECTROCONDUCTIVE POLYMER

BACKGROUND OF THE INVENTION

1. Field of the Invention

The present invention relates to an oxidant (oxidizing agent) solution for synthesizing a heat-resistant electroconductive polymer and a method for preparing the electroconductive polymer, and more specifically to an oxidant solution for synthesizing, by a chemically oxidative polymerization, a heat-resistant electroconductive polymer which can stably hold its performance for a long term under a high temperature, and which be used in various electric or electronic devices utilizing an optical, electronic or electromagnetic characteristics of the electroconductive polymer, such as a battery cell, a capacitor, a diode, a display element, a secondary cell, a sensor, etc., and also a method for preparing the electroconductive polymer.

2. Description of Related Art

An electroconductive polymer can be said to be one which a conjugative bond highly develops in a polymer chain. A method for preparing the electroconductive polymer includes a chemical polymerization of polymerizing monomers by means of an oxidant or a catalyst, a method for heat-treating a chemical intermediate composed of a non-conjugative monomer, and an electrolytic polymerization for polymerizing the monomer by electrochemically oxidizing or reducing the monomer.

The method for preparing the electroconductive polymer, to which the present invention is directed, is chemical polymerization. In connection with chemical polymerization, there have been proposed a synthesis of a polyacetylene using the Ziegler-Natta catalyst, and a synthesis of a polyparaphenylene for polymerizing benzene by an oxidizing cationic polymerization.

The electroconductive polymer includes, in addition to the polyacetylene and the polyparaphenylene mentioned above, a fused ring electroconductive polymer such as polythiadile, polydiacetylenen and polyazulene, and a heterocyclic compound such as polypyrrole and polythiophene.

These electroconductive polymer are considered to be used as a solid electrolyte for an electrolytic capacitor and applied into a through hole in a printed circuit board since it is possible to easily polymerize into an electroconductive polymer having the conductivity of not less than 10 S/cm by a chemically oxidative polymerization using an oxidant such as an iron salt, for example, iron chloride ($FeCl_3$).

Figure 4A:
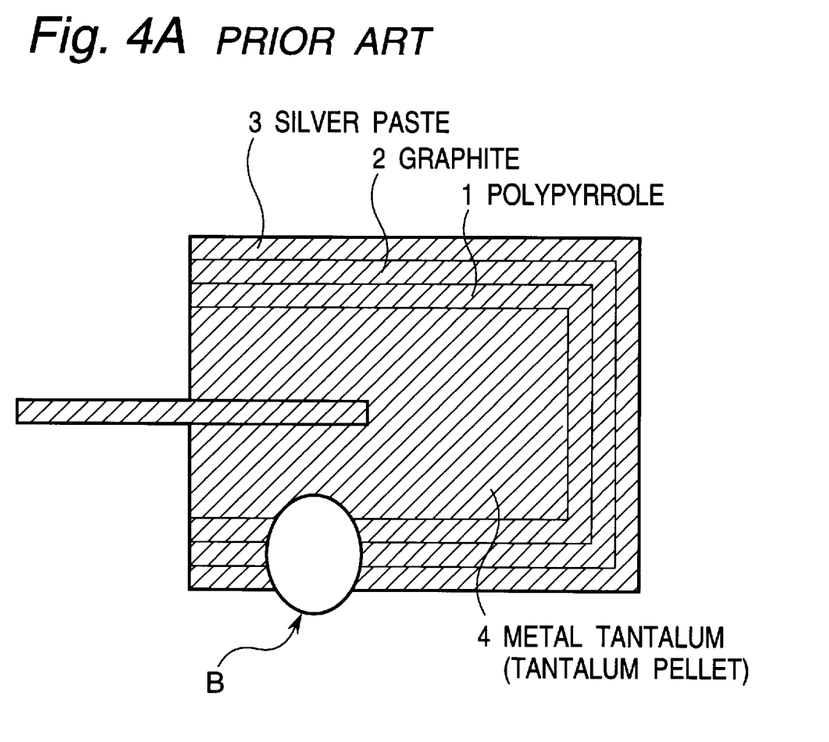
FIG. 4A is a sectional view of the tantalum solid electrolyte capacitor.
Figure 4B:
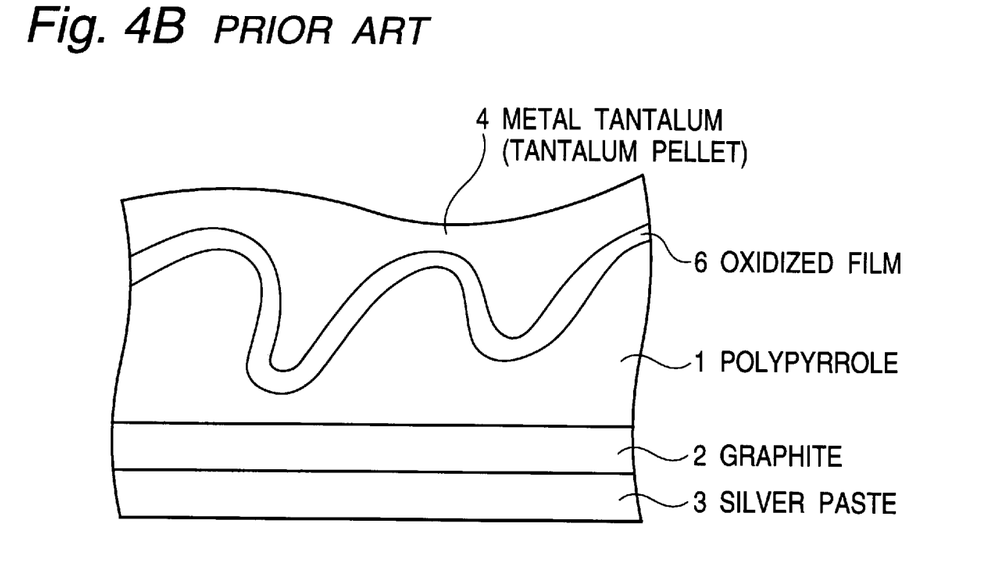
FIG. 4B is an enlarged sectional view of the portion "B" in FIG. 4A.

Here, as one example of an industrial application of the electroconductive polymer, application of the polypyrrole into a tantalum solid electrolyte capacitor will be described with reference to FIGS. 4A and 4B. FIG. 4A is a sectional view of the tantalum solid electrolyte capacitor, and FIG. 4B is an enlarged sectional view of the portion "B" in FIG. 4A.

The shown tantalum solid electrolyte capacitor is formed as follows: A powder sintered body 4 of a metal tantalum which is a valve metal, is anodized in an electrolyte solution such as a phosphoric acid, so that the oxidized film 6 is formed on the tantalum body 4. The tantalum body 4 having the oxidized film 6 formed thereon is immersed in an aqueous solution containing the iron chloride ($FeCl_3$), and then, immersed in a pyrrole monomer to form a polypyrrole. The oxidant solution held in the tantalum sintered body contacts with the pyrrole monomer, so that a polypyrrole layer 1 is formed on the oxidized film 6. In general, a desired polypyrrole thickness cannot be obtained with only one processing. Therefore, after repeatedly performing the above processing, a graphite layer 2 and a silver paste layer 8 are formed on the polypyrrole layer 1 in the named order.

In the iron chloride solution used as the oxidant for forming the polypyrrole, an iron (III) ion acts as the oxidant for the chemically oxidative polymerization for forming the polypyrrole, and a chlorine ion which is a pairing ion is introduced into the polymer as a dopant.

Since the conductivity of the polypyrrole is as large as 100 times that of manganese dioxide which was used in the prior art tantalum solid electrolyte capacitor, the tantalum solid electrolyte capacitor formed as mentioned above has an excellent high frequency characteristics. In addition, since the polypyrrole can be polymerized with only the contact of the pyrrole monomer with the oxidant solution, differently from the electrolytic polymerization, the polymerization is simple and therefore is high in industrial value.

As mentioned above, the chemical polymerization method for preparing the electroconductive polymer, using the iron salt such as the iron chloride, can form the electroconductive polymer having excellent conductivity by a simple process. However, in order to utilize the electroconductive polymer, it is required to have certain exposure properties, in particular, stability under a high temperature. In general, the electroconductive polymer is in a highly oxidized condition doped with anion, and therefore, is easily deteriorated with a coacting external factor such as heat, light, oxygen or water. This is a large hindrance in utilizing the electroconductive polymer as a device material. This is not exception in the polypyrrole having a relatively high thermal stability.

In order to increase the heat-resistant property of the polypyrrole, various methods have been proposed. For example, Japanese Patent Application Post-examination Publication No. JP-B-5-64970 and the corresponding U.S. Pat. No. 4,697,001 (the content of which are incorporated by reference in its entirety into this application) reports that a thermally stable polypyrrole can be obtained by oxidatively polymerizing the pyrrole, using a strong oxidant including cations of $Fe^{3+}$, $Cu^{2+}$, $Ce^{4+}$ and $(C_6H_5)_3C^{3+}$, in the presence of a dopant anion selected from the group consisting of alkylsulfonate, arylsulfonate and fluorinated carboxylate.

In addition, Japanese Patent Application Pre-examination Publication No. JP-A-09-025417, (the content of which is incorporated by reference in its entirety into this application, and also an English abstract of JP-A-09-025417 is available from the Japanese Patent Office and the content of the English abstract of JP-A-09-025417 is also incorporated by reference in its entirety into this application) propose to use, as a dopant anion, a compound including at least one of —COOH— and —OH—. This proposal is to prevent an oxidation deterioration of the polypyrrole starting from a proton dissociation of the pyrrole ring "N—H" or elimination of hydrogen of the β site, by proton or hydrogen supplied from the dopant.

In fact, however, in the case of forming the electroconductive polymer such as polypyrrole by a chemical polymerization, even if the compound including at least one of —COOH— and —OH— is utilized as the dopant anion with the purpose of realizing the thermal stability of the electroconductive polymer, a satisfactory heat-resistant property cannot be obtained.

The reason for this is that: when the protonic solvent is used as a solvent for the iron salt, containing the dopant anion, the dopant anion cooperates with the iron (III) ion to form a chelate complex, which is taken or entrapped into the electroconductive polymer such as polypyrrole. The proton or hydrogen to be supplied from the dopant is not actually supplied, with the result that the thermal stability is lowered.

SUMMARY OF THE INVENTION

Accordingly, it is an object of the present invention to provide an oxidant solution for synthesizing a heat-resistant electroconductive polymer and a method for preparing the electroconductive polymer, which have overcome the above mentioned defect of the conventional one.

Another object of the present invention is to provide an oxidant solution for synthesizing a heat-resistant electroconductive polymer, which can prepare the electroconductive polymer having the thermal stability.

The co-inventors of this application studied the oxidant for the chemically oxidative polymerization for synthesizing the heat-resistant electroconductive polymer, and invented an oxidant solution having a specific chemical structure dissolved in a non-protonic solvent.

According to a first aspect of the present invention, there is provided an oxidant solution for synthesizing a heat-resistant electroconductive polymer, composed of a solution of a non-protonic organic solvent dissolving an oxidant of the organic compound iron salt expressed by the following formula:

$$Fe^{3++sc\ O}[(X)_L\text{—}(M)_m\text{—}(Y^-)_n]pH^+q \qquad (1)$$

where X is COOH or OH
M is organic compound
Y is strong electrolytic anion
"L", "m" and "n" are not less than 1
3o+q=np, but in the case of o=1, 3<p According to a second aspect of the present invention, there is provided an oxidant solution for synthesizing a heat-resistant electroconductive polymer, composed of a solution of a non-protonic organic solvent dissolving an oxidant of the organic compound iron salt expressed by the following formula:

$$Fe^{3++sc\ O}[(X)_L\text{—}(Ar)\text{—}(SO_3^-)_n]pH^+q \qquad (2)$$

where X is COOH or OH
Ar is aromatic compound
"L" and "n" is not less than 1
3o+q=np, but in the case of o=1, 3<p In the above mentioned chemical formulas 1 and 2, the non-protonic organic solvent can be acetonitorile.

According to a third aspect of the present invention, there is provided a method for preparing an electroconductive polymer, by a chemically oxidative polymerization using as an oxidant solvent a non-protonic organic solvent solution dissolving an oxidant of the organic compound iron salt expressed by the above formula 1 or 2. Here, the electroconductive polymer is polypyrrole, polythiophene, polyaniline or derivative thereof.

Figure 5:
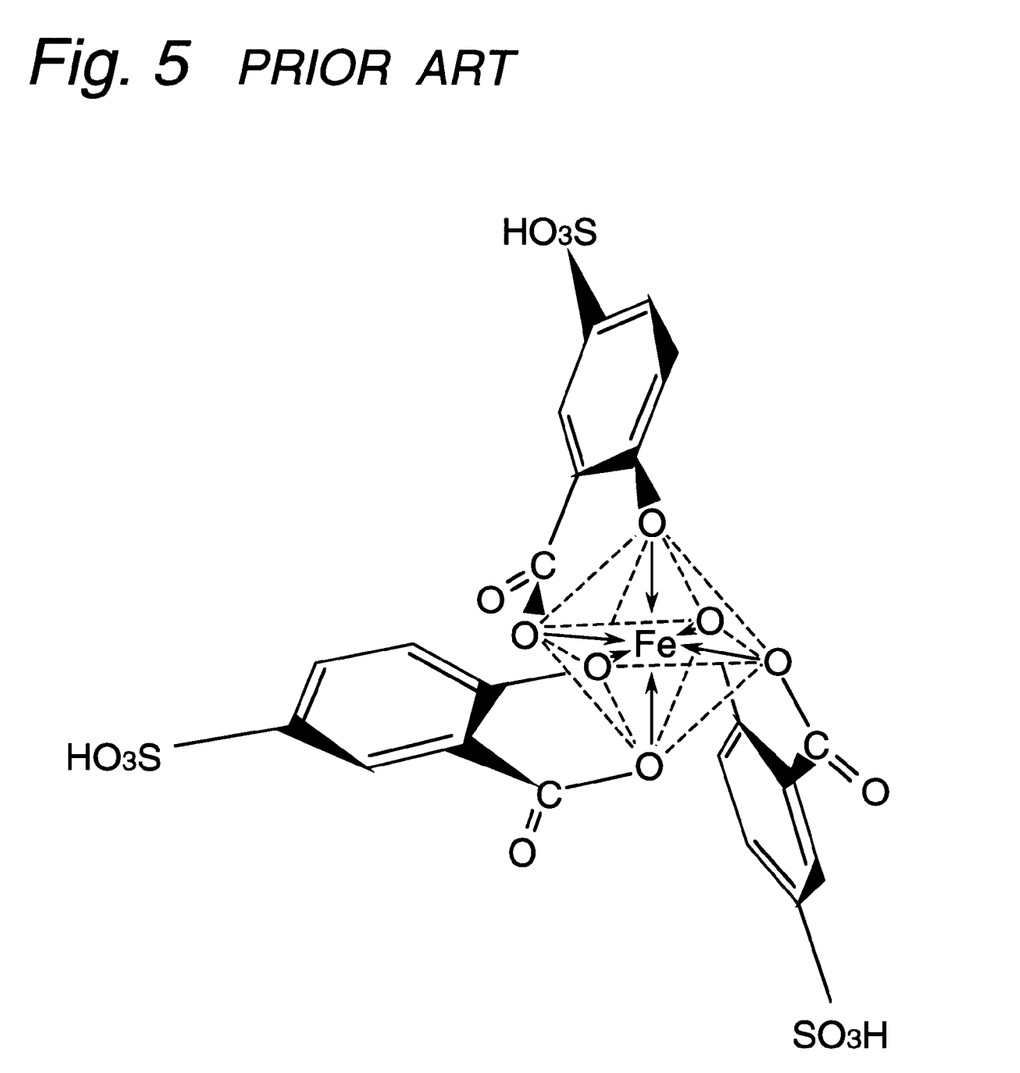
FIG. 5 illustrates the structure of the chelate compound produced by a combination of the prior art oxidant and the protonic solvent.

The oxidant solution in accordance with the present invention can be prepared by introducing an iron (III) ion as an oxidant, into a non-protonic organic solvent, such as acetonitorile, dissolving a high concentration of a derivative of aromatic sulfonic acid having, as a substituting group, at least one of the OH group and the COOH group which is an acidic group, In the prior art, if the derivative of aromatic sulfonic acid having the OH group or the COOH group as the substituting group is used, the OH group or the COOH group dissociates to react with a metal ion such as the iron(III) ion so as to form a complex salt (chelate complex) as shown in FIG. 5. This complex salt is taken or entrapped into the electroconductive polymer as the dopant anion, with the result that the heat-resistant property cannot be elevated. Namely, as seen from FIG. 5, "H" of the OH group or the COOH group is lost because of formation of the chelate of the iron (III) ion with the OH groups or the COOH groups, and therefore, the metal ion such as the iron (III) ion functioning as the catalyst in oxidation is taken or entrapped into the electroconductive polymer.

The most important point in the present invention is that the derivative of aromatic sulfonic acid having the OH group or the COOH group as the substituting group is dissolved in the non-protonic organic solvent, so that the dissociation of the OH group or the COOH group is suppressed or minimized, and therefore, the formation of the complex salt (chelate compound) with the metal ion is suppressed or minimized, with the result that derivative of aromatic sulfonic acid is effectively introduced into the electroconductive polymer as the dopant anion for elevating the heat resistant property.

The electroconductive polymer which can be chemically oxidatively polymerized by using the oxidant in accordance with the present invention, can be exemplified by a polymer using, as a monomer, polypyrrole derivative, polyaniline derivative, polythiophene derivative, polyphenylene derivative, polyacetylene derivative, polyfuran derivative, polyphenylenevinylene derivative, polyacetone derivative, polyazulene derivative, or a copolymer of two or more of the above derivatives. In general, if an oxidizing potential is not larger than 1 eV, and if it is a p-type electroconductive polymer having the conductivity of not less than $10^{-10}$ S/cm in an oxidized condition.

The electroconductive polymer from a chemically oxidative polymerization using the oxidant solution thus prepared, has a thermal stability under a high temperature atmosphere, which could not be obtained in the prior art. According to the present invention, it becomes possible to form various devices such as an optical, electronic or electromagnetic device, using the electroconductive polymer having a high reliability under a high temperature.

The above and other objects, features and advantages of the present invention will be apparent from the following description of preferred embodiments of the invention with reference to the accompanying drawings.

DESCRIPTION OF THE PREFERRED EMBODIMENTS

Figure 1:
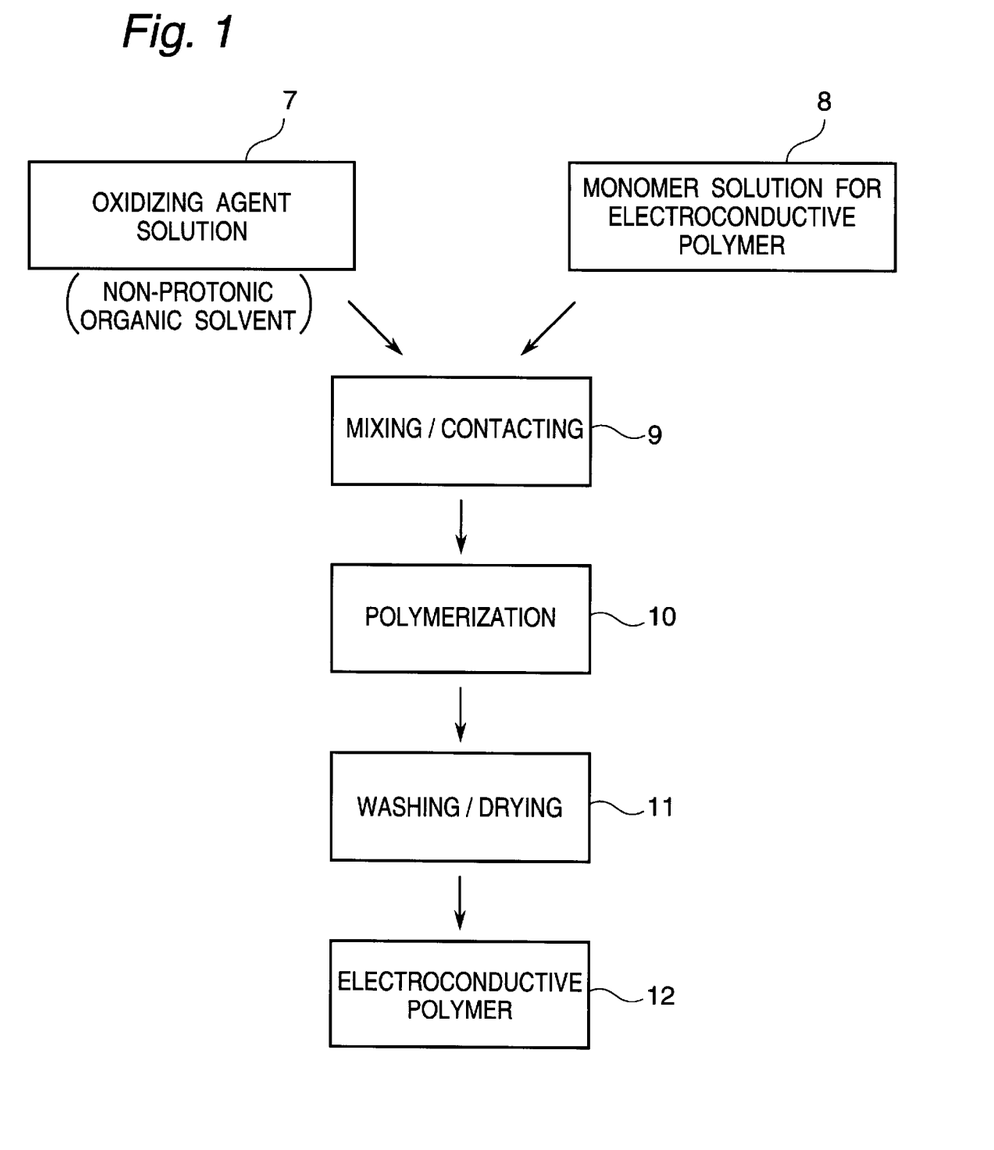
FIG. 1 is a flow chart illustrating the process in accordance with the present invention for preparing the electroconductive polymer.

Referring to FIG. 1, there is shown a flow chart illustrating the process in accordance with the present invention for preparing the electroconductive polymer.

First, a solution of a non-protonic organic solvent dissolving the organic compound iron salt expressed by the above mentioned chemical formula 1, is prepared as an oxidant solution 7, and a solution 8 of a monomer for the electroconductive polymer is also prepared.

The oxidant solution 7 and the solution 8 of the monomer for the electroconductive polymer are mixed and contacted at a substrate (mixing and contacting step 9), to cause a polymerizing reaction of the monomer for the electroconductive polymer (polymerization step 10) so that a electroconductive polymer is formed by the chemically oxidative polymerization in the solution. Here, in the case of the tantalum solid electrolyte capacitor, the substrate is the oxidized film of the tantalum sintered body. However, the substrate may be conductive or insulative. In addition, the substrate is not necessarily planar, and can take any shape if the oxidant solution and the solution of the monomer for the electroconductive polymer can reach to the substrate.

Thereafter, the solution is washed and filtered, and the solvent is removed by a drying (washing and drying step 11). Thus, the electroconductive polymer 12 is obtained. The electroconductive polymer thus prepared and an electroconductive polymer formed from the chemically oxidative polymerization using the solution dissolving the oxidant of the organic compound salt by the conventional protonic solvent, are left in atmosphere of 150° C., and the change of the conductivity with time was measured by a standard four-point probe method. The result of the measurement is shown in FIG. 2.

Figure 2:
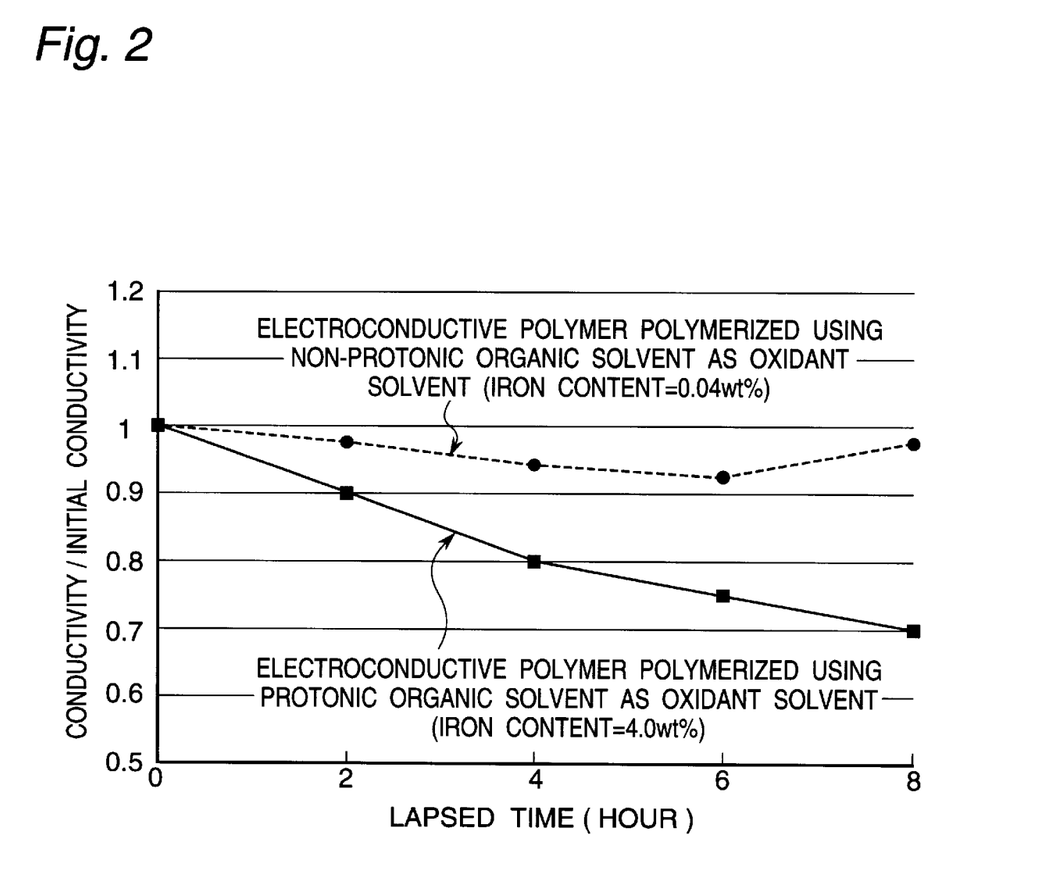
FIG. 2 a graph showing the change of the conductivity of the electroconductive polymer in a heat resistant test, for illustrating the advantage of the with the present invention.

As seen from FIG. 2, the electroconductive polymer formed from the chemically oxidative polymerization using the solution dissolving the oxidant of the organic compound salt by the non-protonic organic solvent (indicated by ●) is more excellent in heat resistant property than the electroconductive polymer formed from the chemically oxidative polymerization using the solution dissolving the oxidant of the organic compound salt by the protonic organic solvent (indicated by ■)

Next, the feature of the present invention will be described in detail. Of the oxidant, the solvent for the oxidant and the monomer for the electroconductive polymer, which are constituents of the present invention, the important point is the combination of the derivative of aromatic sulfonic acid having as a substituting group at least one of the OH group and the COOH group which is the pairing anion of the iron (III) ion and the pairing anion which constitute the oxidant, with the non-protonic solvent.

In the process shown in FIG. 1, when the oxidant solution 7 and the solution 8 of the monomer for the electroconductive polymer are mixed and contacted, if the non-protonic solvent is used as the solvent 7 for the oxidant, the chelate complex as shown in FIG. 5 is not produced. Therefore, the "H" of the OH group or the COOH group which is included in the pairing anion of the oxidant and which is required to prevent the heat deterioration of the electroconductive polymer, is taken or entrapped into the electroconductive polymer.

This supplies the proton or hydrogen when a proton dissociation of the pyrrole main ring "N—H" or elimination of hydrogen of the β site, is caused by a heating, with the result that it prevents the oxidation deterioration caused by the succeeding oxygen bonding. Since the hydrogen exists in the electroconductive polymer, it prevents the drop of the conductivity of the electroconductive polymer caused by the destruction of the bipolar structure triggered by the hydrogen ion dissociation from the main chain of the electroconductive polymer. As a result, the electroconductive polymer having a high heat resistant property can be obtained.

Embodiment 1

100 ml of acetonitorile solution of $Fe^{3+}$/5-sulfosalicylic acid=0.1M/0.4M was prepared as the oxidant solution. 3 g of pyrrole was chemically oxidatively polymerized for two hours. A precipitated polypyrrole powder was filtered, and washed by water and methanol until the washing liquid becomes transparent. Therefore, it was dried in a vacuum for 12 hours. 15 mg of the obtained polypyrrole was shaped under pressure of 100 kg/cm$^2$ into a pellet having a thickness of 0.5 mm and a diameter of 10 mm. The pellet was heated in air (150° C., 100 hours), and the resistance was measured by the standard four-point probe method. From the measured resistance, the conductivity was calculated in the process of the heating. As a result, the obtained polypyrrole contains 0.04 wt % of iron as impurity, and the change of the conductivity in the process of the heating was small. In addition, the conductivity after the heating of 150° C. and 100 hours was about 80% of an initial conductivity before the heating. Therefore, a high heat stability was recognized.

Comparative Example 1

The polypyrrole was prepared by the same condition as that of the Embodiment 1, excepting that acetonitorile solution of $Fe^{3+}$/n-dodecylbenzensulfonic acid=0.1M/0.4M was used as the oxidant solution. After the polypyrrole pellet was heated in air (150° C., 100 hours), the resistance was measured. After the heating of 20 hours, the conductivity of the polypyrrole dropped 15% of the initial conductivity. Namely, it was confirmed that the conductivity of the polypyrrole drops because of the heating.

Comparative Example 2

The polypyrrole was prepared by the same condition as that of the Embodiment 1, excepting that methanol solution of $Fe^{3+}$/5-sulfosalicylic acid=0.1M/0.4M was used as the oxidant solution. After the polypyrrole pellet was heated in air (150° C., 100 hours), the resistance was measured. The obtained polypyrrole contains 4 wt % of iron as impurity, and after the heating of 20 hours, the conductivity of the polypyrrole dropped 5% of the initial conductivity. Namely, it was confirmed that the conductivity of the polypyrrole drops because of the heating Embodiment 2

The polypyrrole was prepared by the same condition as that of the Embodiment 1, excepting that acetonitorile solution of $Fe^{3+}$/5-sulfosalicylic acid/p-phenolsulfonic acid=0.1M/0.3M/0.3M was used as the oxidant solution. After the polypyrrole pellet was heated in air (150° C., 100 hours), the resistance was measured. A substantial change of the conductivity in the process of the heating could not found. The conductivity after the heating of 150° C. and 100 hours was about 95% of an initial conductivity before the heating. Therefore, a high heat stability was recognized.

Embodiment 3

100 ml of acetonitorile solution of $Fe^{3+}$/m-sulfobenzonic acid=0.1M/0.5M was prepared as the oxidant solution. 5 g of 3-methylthiophene was chemically oxidatively polymerized for ten hours. A precipitated polypyrrole powder was filtered, and washed by methanol and acetone until the washing liquid becomes transparent. Therefore, it was dried in a vacuum for 12 hours. 10 mg of the obtained 3-methylthiophene was shaped under pressure of 100 kg/cm² into a pellet having a thickness of 0.2 mm and a diameter of 10 mm. The pellet was heated in air (150° C., 100 hours), and the resistance was measured by the standard four-point probe method. From the measured resistance, the conductivity was calculated in the process of the heating. As a result, he change of the conductivity in the process of the heating was small. In addition, the conductivity after the heating of 150° C. and 100 hours was about 75% of an initial conductivity before the heating. Therefore, a high heat stability was recognized.

Comparative Example 3

The polypyrrole was prepared by the same condition as that of the Embodiment 3, excepting that ethanol solution of $Fe^{3+}$/p-toluensulfonic acid=0.1M/0.4M was used as the oxidant solution. After the polymer pellet was heated in air (150° C., 100 hours), the resistance was measured. After the heating of 20 hours, the conductivity of the polypyrrole dropped 10% of the initial conductivity. Namely, it was confirmed that the conductivity of the electroconductive polymer drops because of the heating.

Figure 3:
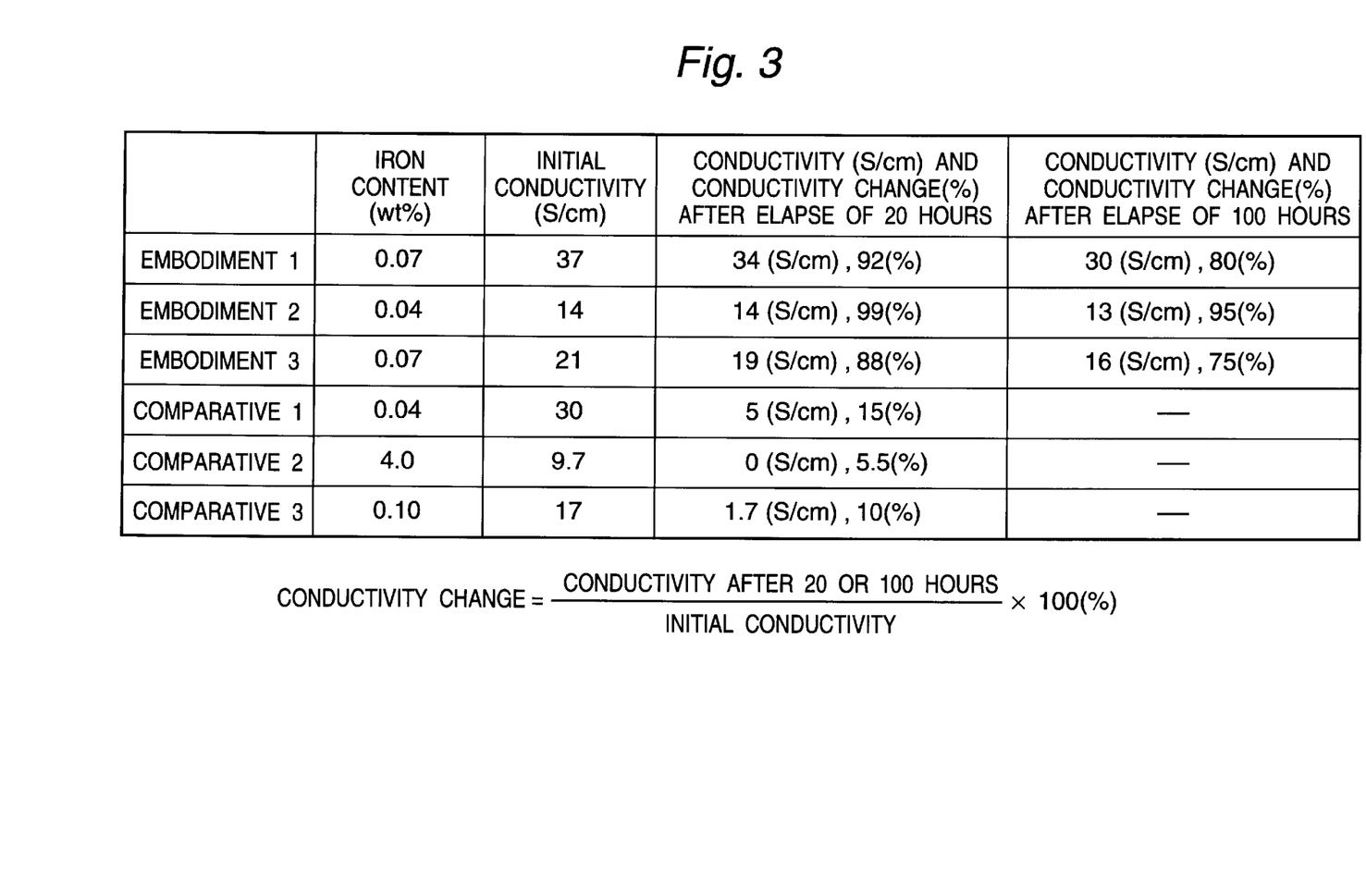
FIG. 3 is a table illustrating the heat resistant property of the electroconductive polymer.

FIG. 3 is a table illustrating the heat resistant property of the electroconductive polymer of the Embodiments 1 to 3 and the Comparative Examples 1 to 3 as mentioned above.

As seen from the above, the electroconductive polymer from a chemically oxidative polymerization using the oxidant solution in accordance with the present invention, has a thermal stability under a high temperature atmosphere, which could not be obtained in the prior art. According to the present invention, it becomes possible to various devices such as an optical, electronic or electromagnetic device, using the electroconductive polymer having a high reliability under a high temperature.

The reason for this is that, the derivative of aromatic sulfonic acid having as the substituting group at least one of the OH group and the COOH group which have the effect of elevating the heat resistant property, is dissolved in the non-protonic organic solvent, so that the formation of the complex salt (chelate compound) with the metal ion is suppressed or minimized, with the result that derivative of aromatic sulfonic acid is effectively introduced into the electroconductive polymer as the dopant anion for elevating the heat resistant property.

The invention has thus been shown and described with reference to the specific embodiments. However, it should be noted that the present invention is in no way limited to the details of the illustrated structures but changes and modifications may be made within the scope of the appended claims.

We claim:

1. An oxidant solution for synthesizing a heat-resistant electroconductive polymer, comprising a solution of a non-protonic organic solvent and an oxidant of the organic compound iron salt expressed by the following formula:

$$Fe^{3++sc}{}^O[(X)L\text{---}(M)m\text{---}(Y^-)n]pH^+q$$

where X is COOH or OH
M is organic compound
Y is strong electrolytic anion
"L", "m" and "n" are not less than 1
3o+q=np, but in the case of o=1, 3<p.

2. An oxidant solution claimed in claim 1 wherein said non-protonic organic solvent is acetonitorile.

3. An oxidant solution for synthesizing a heat-resistant electroconductive polymer, comprising a solution of a non-protonic organic solvent and an oxidant of the organic compound iron salt expressed by the following formula:

$$Fe^{3++sc}{}^O[(X)L\text{---}(Ar)\text{---}(SO_3^-)n]pH^+q$$

where X is COOH or OH
Ar is aromatic compound
"L" and "n" is not less than 1
3o+q=np, but in the case of o=1, 3<p.

4. An oxidant solution claimed in claim 3 wherein said non-protonic organic solvent is acetonitorile.

5. A method for preparing a heat-resistant electroconductive polymer, wherein said electroconductive polymer is formed by chemically oxidative polymerization, using an oxidant solution composed of a solution of a non-protonic organic solvent and an oxidant of the organic compound iron salt expressed by the following formula:

$$Fe^{3++sc}{}^O[(X)L\text{---}(M)m\text{---}(Y^-)n]pH^+q$$

where X is COOH or OH
M is organic compound
Y is strong electrolytic anion
"L", "m" and "n" are not less than 1
3o+q=np, but in the case of o=1, 3<p.

6. A method claimed in claim 5 wherein said non-protonic organic solvent is acetonitorile.

7. A method claimed in claim 5 wherein said electroconductive polymer is one selected from the group consisting of polypyrrole, polythiophene, polyaniline and derivative thereof.

8. A method claimed in claim 5 wherein said organic compound M is aromatic compound, and "m" is 1, and said strong electrolytic anion Y is a sulphonic acid group.

9. A method claimed in claim 8 wherein said non-protonic organic solvent is acetonitorile.

10. A method claimed in claim 9 wherein said electroconductive polymer is one selected from the group consisting of polypyrrole, polythiophene, polyaniline and derivative thereof.

* * * * *

UNITED STATES PATENT AND TRADEMARK OFFICE
CERTIFICATE OF CORRECTION

PATENT NO. : 5,986,046
DATED : November 16, 1999
INVENTOR(S): Nishiyama et al

It is certified that error appears in the above-identified patent and that said Letters Patent are hereby corrected as shown below:

Item [54], "OXZIDENT" should be -- -OXIDENT- --.

Claim 1, Col 8, Line 3, "$Fe^{3++scO}$" should be -- -$Fe^{3+}_{o}$- --.

Claim 3, Col. 8, Line 15, "$Fe^{3++scO}$" should be -- -$Fe^{3+}_{o}$- --.

Claim 5, Col. 8, Line 28, "$Fe^{3++scO}$" should be -- -$Fe^{3+}_{o}$- --.

Signed and Sealed this

Twenty-second Day of May, 2001

Attest:

NICHOLAS P. GODICI

*Attesting Officer*   Acting Director of the United States Patent and Trademark Office